(12) United States Patent
Pei

(10) Patent No.: US 8,203,427 B2
(45) Date of Patent: Jun. 19, 2012

(54) RFID DIRECTION TRIGGER DRIVER

(75) Inventor: Shauagxi Pei, Groton, MA (US)

(73) Assignee: Oracle International Corporation, Redwood Shores, CA (US)

(*) Notice: Subject to any disclaimer, the term of this patent is extended or adjusted under 35 U.S.C. 154(b) by 760 days.

(21) Appl. No.: 12/020,718

(22) Filed: Jan. 28, 2008

(65) Prior Publication Data

US 2008/0211672 A1    Sep. 4, 2008

Related U.S. Application Data

(60) Provisional application No. 60/892,481, filed on Mar. 1, 2007.

(51) Int. Cl.
*G08B 21/00* (2006.01)
*G08B 13/14* (2006.01)
*G05B 19/00* (2006.01)
*H04Q 5/22* (2006.01)
*G06K 19/06* (2006.01)
*G06F 15/177* (2006.01)

(52) U.S. Cl. ............ 340/5.8; 340/10.1; 340/572.1; 340/673; 235/451; 235/385; 235/492; 235/384; 709/220

(58) Field of Classification Search .................. None
See application file for complete search history.

(56) References Cited

U.S. PATENT DOCUMENTS

| | | | | |
|---|---|---|---|---|
| 5,708,423 | A * | 1/1998 | Ghaffari et al. | 340/5.8 |
| 6,255,946 | B1 * | 7/2001 | Kim | 340/556 |
| 6,600,418 | B2 * | 7/2003 | Francis et al. | 340/572.1 |
| 7,221,269 | B2 * | 5/2007 | Onderko et al. | 340/539.13 |
| 7,573,366 | B2 * | 8/2009 | Willins et al. | 340/5.61 |
| 7,821,416 | B2 * | 10/2010 | Venture et al. | 340/673 |
| 2003/0201321 | A1 * | 10/2003 | Maloney | 235/384 |
| 2006/0139159 | A1 * | 6/2006 | Lee et al. | 340/457 |
| 2006/0197652 | A1 * | 9/2006 | Hild et al. | 340/10.2 |
| 2007/0233823 | A1 * | 10/2007 | Traub et al. | 709/220 |
| 2008/0030328 | A1 * | 2/2008 | Sharma | 340/552 |
| 2009/0085723 | A1 * | 4/2009 | Traub et al. | 340/10.3 |

* cited by examiner

*Primary Examiner* — Jennifer Mehmood
*Assistant Examiner* — Fekadeselassie Girma
(74) *Attorney, Agent, or Firm* — Fliesler Meyer LLP

(57) ABSTRACT

One embodiment of the present invention is an RFID system comprising a first detector at a first position and a second detector at a second position. An RFID edge server can include software to check the first and second detector to determine a direction of an object. The direction information can be used to trigger the start or stop of the collection of data for an RFID detector.

26 Claims, 3 Drawing Sheets

RFID DIRECTION TRIGGER DRIVER

CLAIM OF PRIORITY

This application claims priority to U.S. Provisional Application No. 60/892,481 entitled "RFID DIRECTION TRIGGER DRIVER", filed Mar. 1, 2007, which is herein incorporated by reference.

BACKGROUND OF INVENTION

The present invention relates to RFID edge Servers.

RFID Tags are becoming more and more popular as a way of tracking objects such as packages going in and out of warehouses and other locations.

Typically, and RFID tag is read by an RFID reader. The RFID data can then be transferred from the RFID reader to an RFID edge server that can process the RFID data.

One way to process and collect the data is using the EPC Global specification. An ECSpec can be used to define the starting and stopping of RIFD data collection as well as one or more reports.

DETAILED DESCRIPTION

Figure 1:
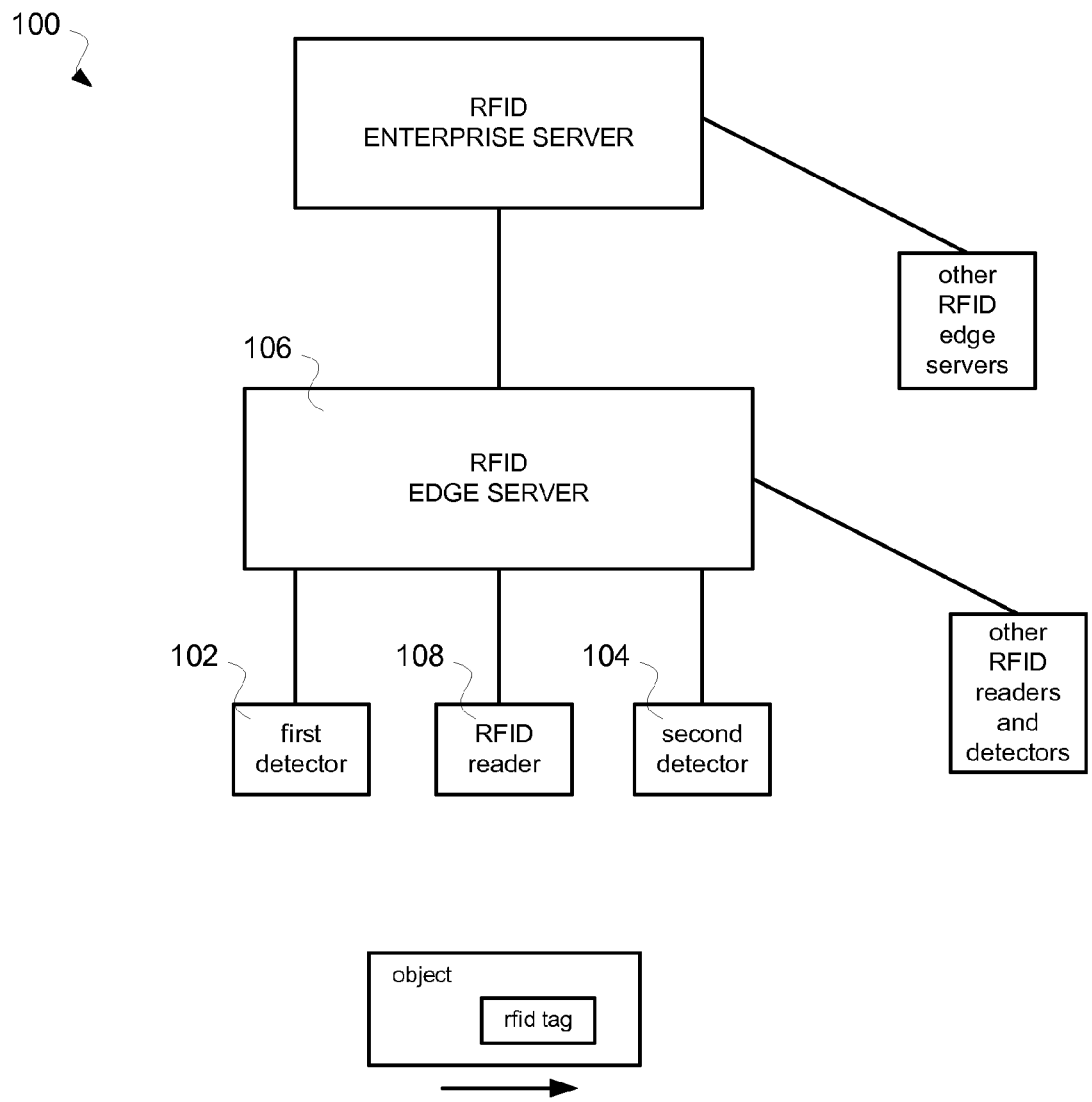
FIG. 1 shows an RFID system in one embodiment.

In one embodiment, an RFID system 100 comprises a first detector 102 at a first position and a second detector 104 at a second position. An RFID edge server 106 can include software to check the first and second detectors 102 and 104 to determine a direction of an object. The direction information can be used to trigger the start or stop of the collection of data for an RFID detector 108.

In one embodiment, based on the sensors signals and timeout period, a state machine can produce four directional signals (abIn, abOut, baIn, and baOut). These four directional signals can be used to start and stop the collection of data.

In one embodiment, if the first detector triggers followed by the second RFID detector, a first direction is indicated. If the second detector triggers followed by the first detector, a second direction can be indicated.

The start and stop of the collection of data can be defined by an ESCSpec. The direction information can be used as a start condition trigger or a stop condition trigger defined by the direction. The detectors can be photoelectric sensors or any other type of sensor. The first and second detector can be used to produce a directional trigger for an ECSpec.

Figure 2:
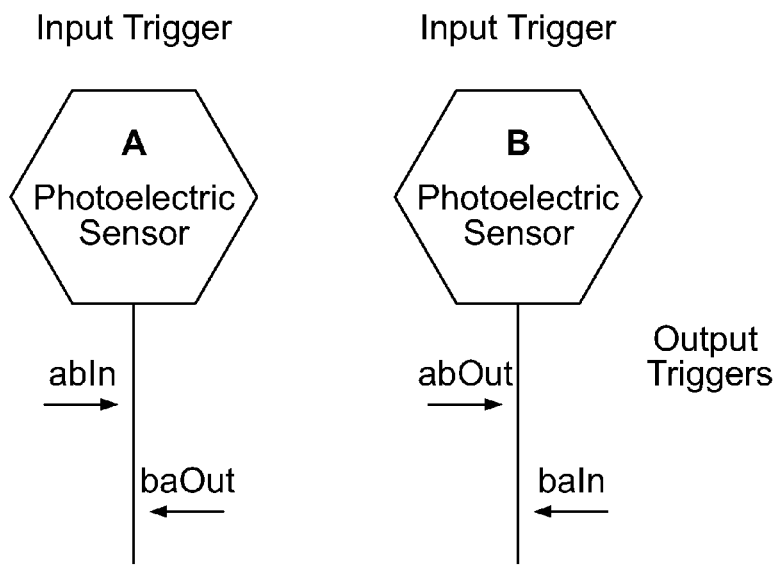
FIG. 2 shows input and output signals for an RFID directional trigger of one embodiment of one embodiment.

In the example of FIG. 2, a trigger driver can get input from two source points A and B, and determine if an object is moving from A to B or from B to A.

1) The trigger driver can listen to two input triggers (a & b) which monitor the status of the two detectors or a PLC ID input from a detector.
2) The trigger driver can maintain a sate machine to record the state change of the trigger driver based on the photo eyes status; the trigger drive can then generate four output triggers (abIn, abOut, baIn, baOut), which can be used to control the start/stop condition of event cycles catching tags entering or exiting a door.

Figure 3:
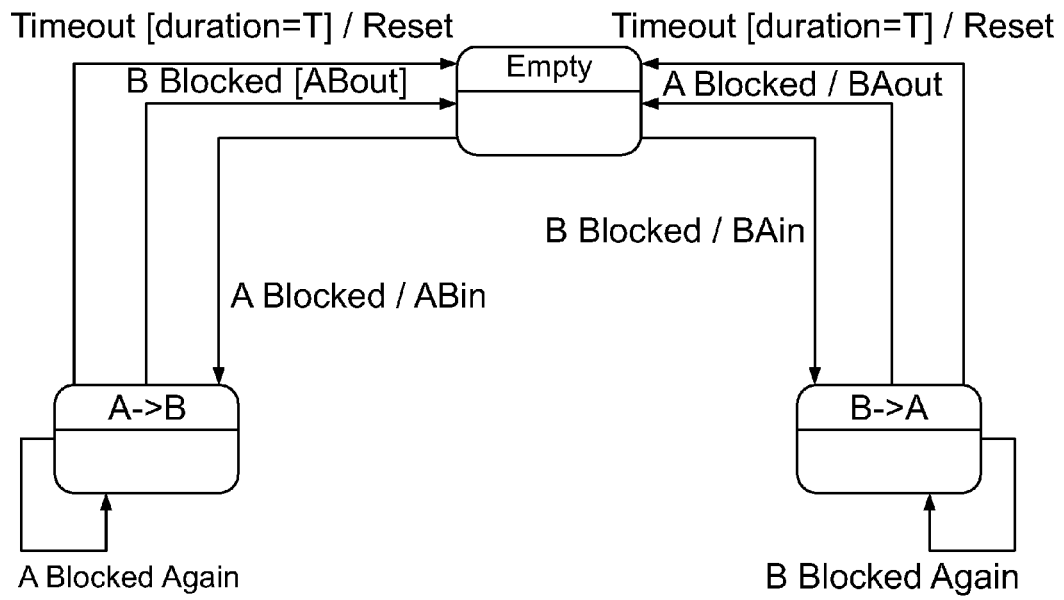
FIG. 3 shows an exemplary state machine for an RFID directional trigger.

FIG. 3 shows an exemplary state machine. In this example, there are three states during the walk:

State empty: the idle state when no body passes by the door;

State->B: photo eye A gets blocked first, a person is walking from point A to B;

State->A: photo eye B gets blocked first, a person is waling from point B to A;

When photo eye A is blocked, state changes to A->B state (waking from A to B). In this step, photo A is considered fired as asIn trigger.

When in A->B state, and A blocked again, ignore it

When B is blocked, the trip is finished, and state is set to Empty. In this case photo eye B fired as about.

If B is not blocked before the timeout period, the state resets to empty.

Exemplary use causes

3) Set up two photo eyes a & b, a reading point at a dock door; tagged item moves between A and B at one direction at a time.
4) Have a PLC setup with two IO inputs at point a & b, a read point between a & b; tagged item moving between A and B at one direction at a time.

There can be a maximum allowed travel time, T, between points A and B. The trigger can reset after the period T even if an object moves in but fails to block photo eye at the exit point.

Figure 4:
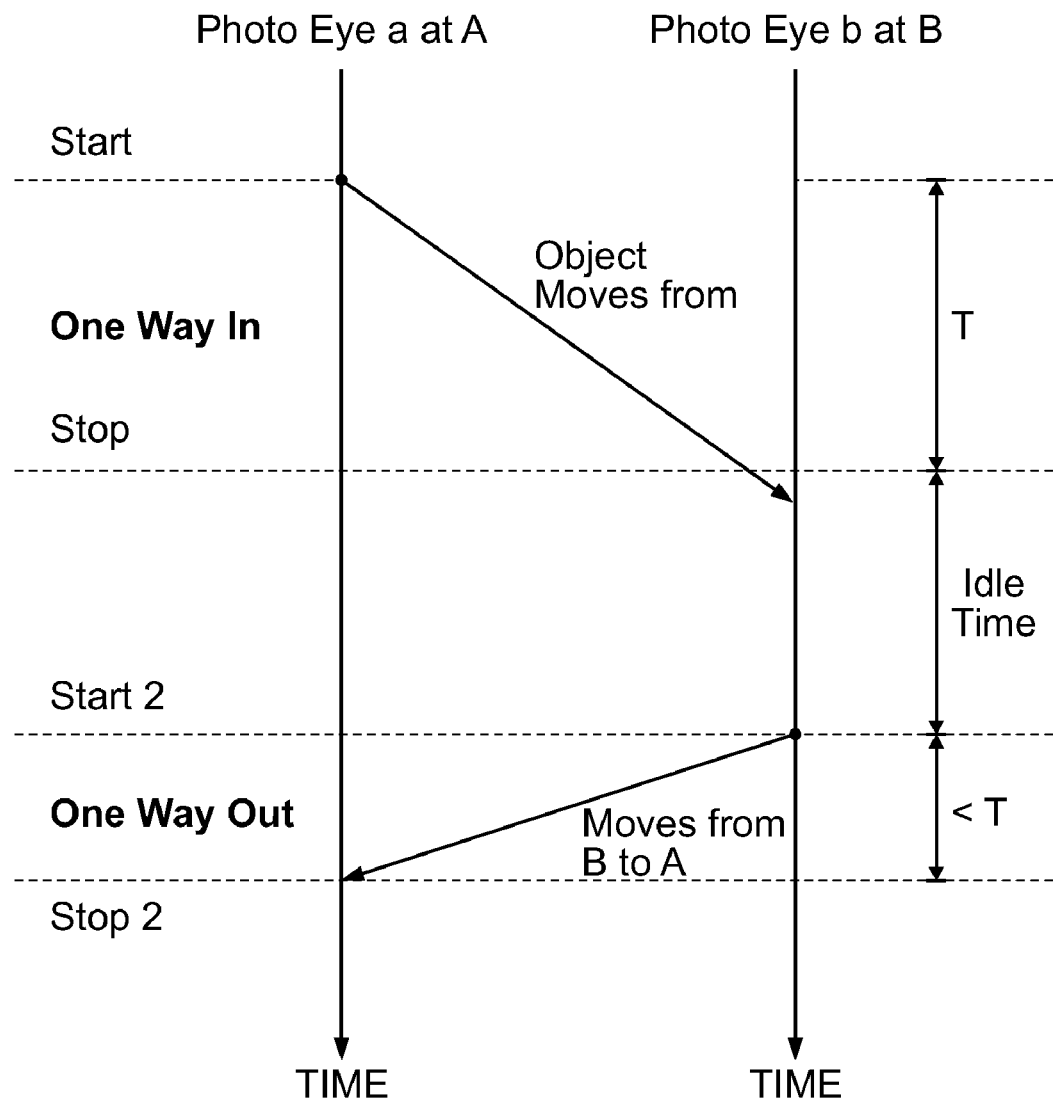
FIG. 4 is a diagram of an example of the operation of a system of one embodiment.

FIG. 4 shows an exemplary timing sequence.

In one embodiment, when DirectionTriggerDriver receives the input triggers (representing server or PLC inputs status), it can update the state machine, generating the trigger messages for trigger listeners in an Event cycle. The trigger message can trigger the start and/or stop the ECSpecs. The resulting ECReports (incoming or outgoing) can be forwarded to observation portal or an RFID enterprise server.

A DirectionTriggerDriver can notify an EventCycle of trigger messages through a TriggerObserver interface. The start and stop triggers defined in the ESCpec can be a type of TriggerObserver, which listens for trigger messages from the Trigger Driver.

DirectionTriggerDriver class can listen for input triggers. The input trigger can come from PLCTrigger, which traces the source to PLCInboundMessages, further to the photo eyes, or PLC inputs. Other type of triggers may also serve as the input trigger.

In one embodiment, the directional trigger driver monitors the status (state change) of the input triggers, for example, when the photoelectric sensors are blocked. When the trigger driver can receive the input trigger status, it can generate trigger messages for trigger listeners in the event cycle, one listener for event start conditions and one for event stop conditions. When the start trigger is fired, the event cycle starts getting RFID tag data; the event cycle stops when either the stop trigger fires or the cycle duration time expires.

In one embodiment, a directional trigger driver in a file, such as the edge.props file, can specify the trigger driver class name, the timeout (in milliseconds), and two input triggers. In the edge.props file example below, the directional trigger name is door1; one can substitute the trigger name with any string.

Listing 1 Directional Trigger Driver Configuration

```
#Define the directional trigger
#Trigger driver class name
com.connecterra.ale.triggerDriver.door1.class=
com.connecterra.ale.triggertypes.DirectionTriggerDriver
#Directional trigger state timeout (once start trigger is fired, but stop
#trigger failed to fire, the directional trigger will reset to idle state
#after timeout period in ms)
com.connecterra.ale.triggerDriver.door1.timeout=10000
#input trigger URI at point 'a'
com.connecterra.ale.triggerDriver.door1.aTrigger=plcmessage:photoeye1
#input trigger URI at point 'b'
com.connecterra.ale.triggerDriver.door1.bTrigger=plcmessage:photoeye2
```

The directional trigger driver can generate four output trigger URIs; for example, door1:abIn, door1:abOut, door1:baIn, door1:baOut. One can use the trigger URI to specify the starting condition (for example, door1 abIn) or stopping condition (for example, door1 abOut) in the event cycle definition. abIn, abOut, baIn and baOut are defined names.

This following example describes using the directional trigger driver with a Symbol XR400 reader and Symbol XR400 Reader Light Indication Box. Photoelectric sensors can be connected to the Light Indication Box, then to the reader GPIO input ports (in this example at pin #4 and #5 The GPIO port status is forwarded to the directional trigger driver using the Reader type PLC transport and the simple message convention.

To configure the directional trigger and the reader, one can perform the following steps:
 5) In the edge.props file, define the following properties (see Listing 2):
  GPIO transport name and type
  Message convention
  Input triggers for points a and b
  Directional trigger driver
 6) In the ECSpec (for the example directional trigger named door1), define the following start and stop conditions:
  Start Trigger URI: door1:abIn for 'a' to 'b' movement (or door1.baIn for 'b' to 'a' movement)
  Stop Trigger URI: door1 abOut for 'a' to 'b' movement (or door1.baOut for 'b' to 'a' movement)
  Stop duration (for example, 10000 ms)
 7) Configure the Symbol XR400 reader for GPIO mode, as described in "Enabling GPIO
 8) In the Administration Console, configure these Symbol XR400 reader parameters:
  Enable Reader GPIO Mode (enableGPIO): true.
  GPIO Transport Name: mygpio (as defined in edge.props, bolded in Listing 2)

Listing 2 Example GPIO Directional Trigger Configuration

```
#In edge.props file
#Define the PLC Transport type 'Reader' named 'mygpio'
com.connecterra.ale.plc.plcTransport.mygpio.metaName = Reader
#Define the message convention 'Simple' named 'simplegpio'
com.connecterra.ale.plc.plcMessageConvention.sim-
plegpio.metaName = Simple
com.connecterra.ale.plc.plcMessageConvention.simplegpio.plcTrans-
port = mygpio
#Define inboundMessage named 'photoeye1'
com.connecterra.ale.plc.inboundMessage.photoeye1.plcMes-
sageConvention = simplegpio
#Photoeye1 connected to the reader's GPIO input port pin #5
com.connecterra.ale.plc.inboundMessage.photoeye1.receiveItem = input5
com.connecterra.ale.plc.inboundMessage.photoeye1.matchValues = true
#Define inboundMessage named 'photoeye2'
com.connecterra.ale.plc.inboundMessage.photoeye2.plcMes-
sageConvention = simplegpio
#Photoeye2 connected to reader's GPIO input port pin #4
com.connecterra.ale.plc.inboundMessage.photoeye2.receiveItem = input4
com.connecterra.ale.plc.inboundMessage.photoeye2.matchValues = true
#Define the input trigger named 'plcmessage' using the driver
#PLCTriggerDriver
com.connecterra.ale.triggerDriver.plcmessage.class=com.con-
necterra.ale.triggertypes.PLCTriggerDriver
#Define the directional trigger
#Driver class name
com.connecterra.ale.triggerDriver.door1.class=com.connecterra.ale.trig-
gertypes.DirectionTriggerDriver
#Directional trigger state timeout (once start trigger is fired, but stop
#trigger failed to fire, the trigger will reset to idle state after timeout
#period in ms)
com.connecterra.ale.triggerDriver.door1.timeout=10000
#input trigger URI 'a'
com.connecterra.ale.triggerDriver.door1.aTrigger=plcmessage:photoeye1
#input trigger URI 'b'
com.connecterra.ale.triggerDriver.door1.bTrigger=plcmessage:photoeye2
```

The following example defines a directional trigger named door2 and uses two PLC IO inputs as input triggers. The PLC inputs are forwarded to the directional trigger driver using the ModBus type PLC transport and the simple message convention. The RFID Edge Server communicates with the PLC using the Modbus protocol. The four output trigger URIs are door2:abIn, door2:abOut, door2:baIn, door2:baOut.

Listing 3 Example Directional Trigger Configuration Using PLC Modbus Protocol

```
#In edge.props file
#Define the ModBus transport named 'modbus0'
com.connecterra.ale.plc.plcTransport.modbus0.metaName = ModBus
com.connecterra.ale.plc.plcTransport.modbus0.hostname = localhost
com.connecterra.ale.plc.plcTransport.modbus0.socketTimeout = 10000
com.connecterra.ale.plc.plcTransport.modbus0.pollInterval= 1000
#Define the message convention 'Simple'
com.connecterra.ale.plc.plcMessageConvention.sim-
plemodbus0.metaName = Simple
com.connecterra.ale.plc.plcMessageConvention.sim-
plemodbus0.plcTransport = modbus0
#Define inboundMessages 'msg1' and 'msg2', which are connected
to PLC input
# IO 5 and 6 ('d' is a convention referring to discrete input in ModBus
#protocol)
com.connecterra.ale.plc.inboundMessage.msg1.plcMessageConvention =
simplemodbus0
com.connecterra.ale.plc.inboundMessage.msg1.receiveItem = d5
com.connecterra.ale.plc.inboundMessage.msg1.matchValues = true
com.connecterra.ale.plc.inboundMessage.msg2.plcMessageConvention =
simplemodbus0
com.connecterra.ale.plc.inboundMessage.msg2.receiveItem = d6
com.connecterra.ale.plc.inboundMessage.msg2.matchValues = true
#Define the input trigger named 'plcmessage' using the driver
#PLCTriggerDriver
com.connecterra.ale.triggerDriver.plcmessage.class=com.con-
necterra.ale.triggertypes.PLCTriggerDriver
#Define the directional trigger 'door2' - timeout = 10000ms
com.connecterra.ale.triggerDriver.door2.class=com.con-
necterra.ale.triggertypes.DirectionTriggerDriver
com.connecterra.ale.triggerDriver.door2.timeout=10000
#input trigger a
com.connecterra.ale.triggerDriver.door2.aTrigger=plcmessage:msg1
#input trigger b
com.connecterra.ale.triggerDriver.door2.bTrigger=plcmessage:msg2
```

One embodiment may be implemented using a conventional general purpose of a specialized digital computer or microprocessor(s) programmed according to the teachings of the present disclosure, as will be apparent to those skilled in the computer art. Appropriate software coding can readily be prepared by skilled programmers based on the teachings of the present discloser, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory of media or device suitable for storing instructions and/or data stored on any one of the computer readable medium (media), the present invention can include software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer implemented method for transmitting code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. For example, transmitting includes causing the transfer of code through a portion of a network as a result of previously addressing and sending data including the code to a user. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments where chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

What is claimed is:

1. A radio frequency identification (RFID) system comprising:
    a configuration file that defines a plurality of trigger message responses, wherein each trigger message response is associated with a trigger message generated by one of a plurality of RFID detectors, and wherein the plurality of trigger message responses are adapted to be modified based on a configuration of the plurality of detectors;
    a trigger driver that includes a first detector and a second detector, wherein the plurality of trigger message responses in the configuration file are modified based on a configuration of the first detector and the second detector, and wherein
        the first detector is located at a first position, wherein the first detector detects a presence of an object and generates a first trigger message in response to detecting the presence of the object, and wherein the first trigger message is stored in a state machine;
        the second detector is located at a second position, wherein the second detector detects the presence of said object and generates a second trigger message in response to detecting the presence of the object, and wherein the second trigger message is stored in the state machine;
        wherein the state machine is reset by the trigger driver when a time between the second trigger message being generated and the first trigger message being generated is greater than a defined reset value;
    a RFID edge server that includes a trigger listener that inspects the state machine, wherein the RFID edge server determines whether the first trigger message and the second trigger message are associated with one of the plurality of trigger message responses in the configuration file, to determine whether to trigger starting collection of RFID tag data or stopping collection of the RFID tag data;
    wherein when the RFID edge server determines the first trigger message in the state machine is in the configuration file, the trigger message response associated with the first trigger message initiates collection of RFID tag data for an RFID detector, and wherein when the RFID edge server determines the second trigger message in the state machine is in the configuration file, the trigger message response associated with the second trigger message terminates collection of the RFID tag data for the RFID detector.

2. The RFID system of claim 1, wherein if the first detector triggers followed by the second RFID detector, a first direction is indicated.

3. The RFID system of claim 1, wherein if the second detector triggers followed by the first detector a second direction is indicated.

4. The RFID system of claim 1, wherein starting and stopping the collection of the data is defined by an Event Cycle Specification (ECSpec).

5. The RFID system of claim 4, wherein the ECSpec includes a start condition trigger defined by the direction.

6. The RFID system of claim 4, wherein the ECSpec includes a stop condition trigger defined by the direction.

7. The RFID system of claim 1, wherein the first and second detectors are photoelectric sensors.

8. The RFID system of claim 1, wherein the first and second detectors are used to produce a directional trigger for an Event Cycle Specification (ECSpec).

9. The system of claim 1, wherein the state machine produces one of four directional signals based on a detection order of the start trigger message and the stop trigger message.

10. The system of claim 9, wherein the RFID tag data that is communicated to the RFID administration server is based on one of the four directional signals detected at the state machine.

11. The system of claim 1, wherein the RFID tag data is communicated from a plurality of RFID edge servers to an RFID administration server for processing.

12. A method comprising:
receiving a configuration file that defines a plurality of trigger message responses, wherein each trigger message response is associated with a trigger message generated by one of a plurality of radio frequency identification (RFID) detectors
wherein the plurality of trigger message responses are adapted to be modified based on a configuration of the plurality of RFID detectors, and
wherein the plurality of trigger message responses in the configuration file are modified based on a configuration of a first detector and a second detector;
receiving, at the first detector located at a first position, one or more signals indicating a presence of an object;
generating a first trigger message in response to detecting the presence of the object, and wherein the first trigger message is received by the first direction trigger driver and stored in a state machine;
receiving, at a second detector located at a second position, the one or more signals indicating the presence of the object, said signals received from the second detector located at the second position;
generating a second trigger message in response to detecting the presence of the object, and wherein the second trigger message is received by the second direction trigger driver and stored in the state machine;
resetting the state machine when a time between the second trigger message being generated and the first trigger message being generated is greater than a defined reset value;
inspecting, by a radio frequency identification (RFID) edge server, the state machine;
determining whether the first trigger message and the second trigger message are associated with one of the plurality of trigger message responses in the configuration file, to determine whether to trigger starting collection of RFID tag data or stopping collection of the RFID tag data for an RFID detector positioned in one or more locations; and
wherein when the RFID edge server determines the first trigger message in the state machine is in the configuration file, the trigger message response associated with the first trigger message initiates collection of RFID tag data for an RFID detector, and wherein when the RFID edge server determines the second trigger message in the state machine is in the configuration file, the trigger message response associated with the second trigger message terminates collection of the RFID tag data.

13. The method of claim 12, wherein if the first detector triggers followed by the second RFID detector, a first direction is indicated.

14. The method of claim 12, wherein if the second detector triggers followed by the first detector a second direction is indicated.

15. The method of claim 12, wherein starting and stopping the collection of data is defined by an Event Cycle Specification (ECSpec).

16. The RFID system of claim 15, wherein the ECSpec includes a start condition trigger defined by the direction.

17. The RFID system of claim 15, wherein the ECSpec includes a stop condition trigger defined by the direction.

18. The method of claim 12, wherein the first and second detectors are photoelectric sensors.

19. The method of claim 12, wherein the first and second detectors are used to produce a directional trigger for an Event Cycle Specification (ECSpec).

20. A non-transitory computer readable storage medium storing a set of instructions, said instructions executed by one or more processors to perform a sequence of steps comprising:
receiving a configuration file that defines a plurality of trigger message responses, wherein each trigger message response is associated with a trigger message generated by one of a plurality of radio frequency identification (RFID) detectors
wherein the plurality of trigger message responses are adapted to be modified based on a configuration of the plurality of RFID detectors, and
wherein the plurality of trigger message responses in the configuration file are modified based on a configuration of a first detector and a second detector;
receiving, at the first detector located at a first position, one or more signals indicating a presence of an object;
generating a first trigger message in response to detecting the presence of the object, and wherein the first trigger message is received by the first direction trigger driver and stored in a state machine;
receiving, at a second detector located at a second position, the one or more signals indicating the presence of the object, said signals received from the second detector located at the second position;
generating a second trigger message in response to detecting the presence of the object, and wherein the second trigger message is received by the second direction trigger driver and stored in the state machine;
resetting the state machine when a time between the second trigger message being generated and the first trigger message being generated is greater than a defined reset value;
inspecting, by a radio frequency identification (RFID) edge server, the state machine;
determining whether the first trigger message and the second trigger message are associated with one of the plurality of trigger message responses in the configuration file, to determine whether to trigger starting collection of RFID tag data or stopping collection of the RFID tag data; and
wherein when the RFID edge server determines the first trigger message in the state machine is in the configuration file, the trigger message response associated with the first trigger message initiates collection of RFID tag data for an RFID detector, and wherein when the RFID edge server determines the second trigger message in the state machine is in the configuration file, the trigger message response associated with the second trigger message terminates collection of the RFID tag data for the RFID detector.

21. The non-transitory computer readable storage medium of claim 20, wherein if the first detector triggers followed by the second RFID detector, a first direction is indicated.

22. The non-transitory computer readable storage medium of claim 20, wherein if the second detector triggers followed by the first detector a second direction is indicated.

23. The non-transitory computer readable storage medium of claim 20, wherein starting and stopping the collection of data is defined by an Event Cycle Specification (ECSpec).

24. The non-transitory computer readable storage medium of claim 23, wherein the ECSpec includes a start condition trigger defined by the direction.

25. The non-transitory computer readable storage medium of claim 23, wherein the ECSpec includes a stop condition trigger defined by the direction.

26. The non-transitory computer readable storage medium of claim 20, wherein the first and second detectors are photoelectric sensors.

* * * * *

UNITED STATES PATENT AND TRADEMARK OFFICE
CERTIFICATE OF CORRECTION

PATENT NO. : 8,203,427 B2  
APPLICATION NO. : 12/020718  
DATED : June 19, 2012  
INVENTOR(S) : Pei Page 1 of 1

It is certified that error appears in the above-identified patent and that said Letters Patent is hereby corrected as shown below:

Specification

In column 1, line 22, delete "RIFD" and insert -- RFID --, therefor.

In column 1, line 53, delete "ESCSpec." and insert -- ECSpec. --, therefor.

In column 2, line 09, delete "waling" and insert -- walking --, therefor.

In column 2, line 14, after "it" insert -- . --.

In column 2, line 40, delete "ESCpec" and insert -- ECSpec --, therefor.

In column 3, line 19, delete "door1 abIn)" and insert -- door1:abIn) --, therefor.

In column 3, line 20, delete "door1 abOut)" and insert -- door1:abOut) --, therefor.

Claims

In column 8, line 7, in Claim 16, delete "RFID system" and insert -- method --, therefor.

In column 8, line 9, in Claim 17, delete "RFID system" and insert -- method --, therefor.

Signed and Sealed this  
Sixth Day of October, 2015

Michelle K. Lee  
*Director of the United States Patent and Trademark Office*